No. 869,007. PATENTED OCT. 22, 1907.
W. D. MIDDLEBROOK.
WIRE WORKING MACHINE.
APPLICATION FILED MAR. 28, 1906.
3 SHEETS—SHEET 1.
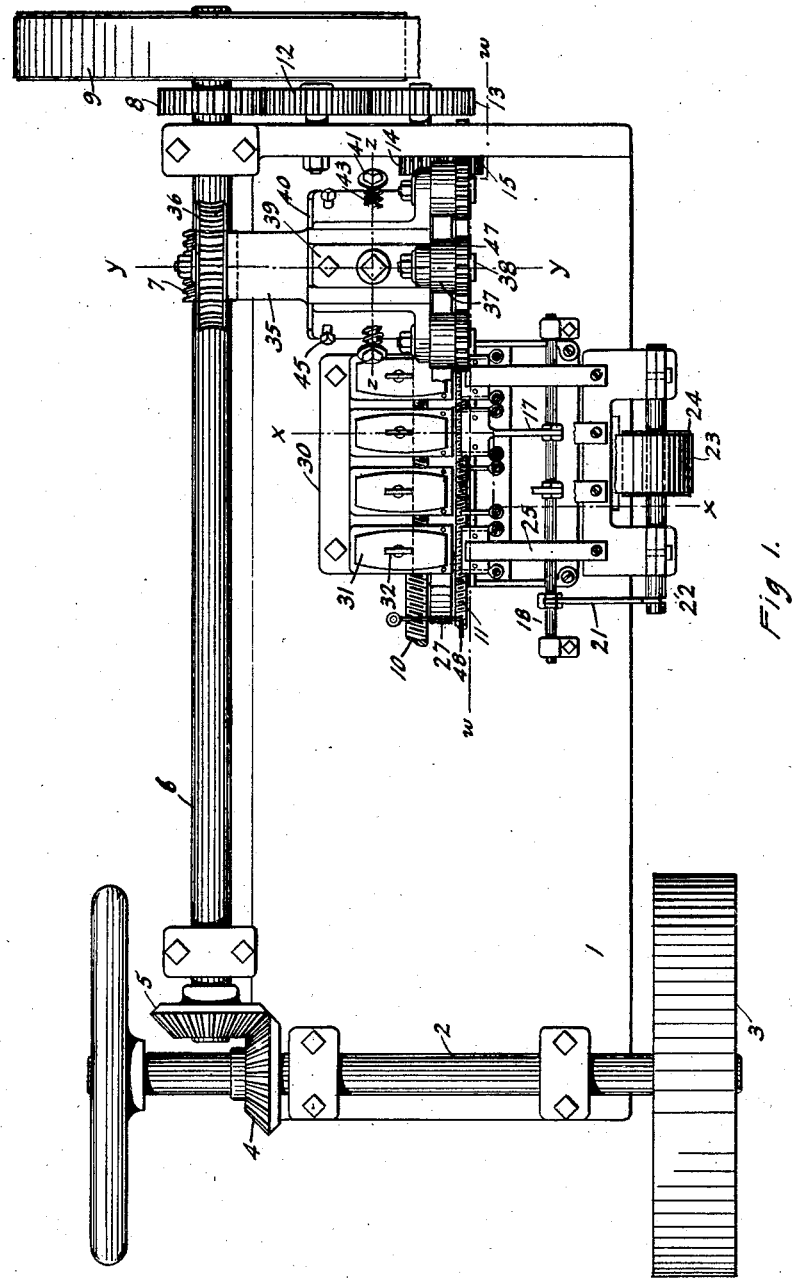
WITNESSES.
James H. Thurston
Catherine G. Bradley.
INVENTOR.
William D. Middlebrook,
By Wilmarth H. Thurston,
Att'y.
THE NORRIS PETERS CO., WASHINGTON, D. C.

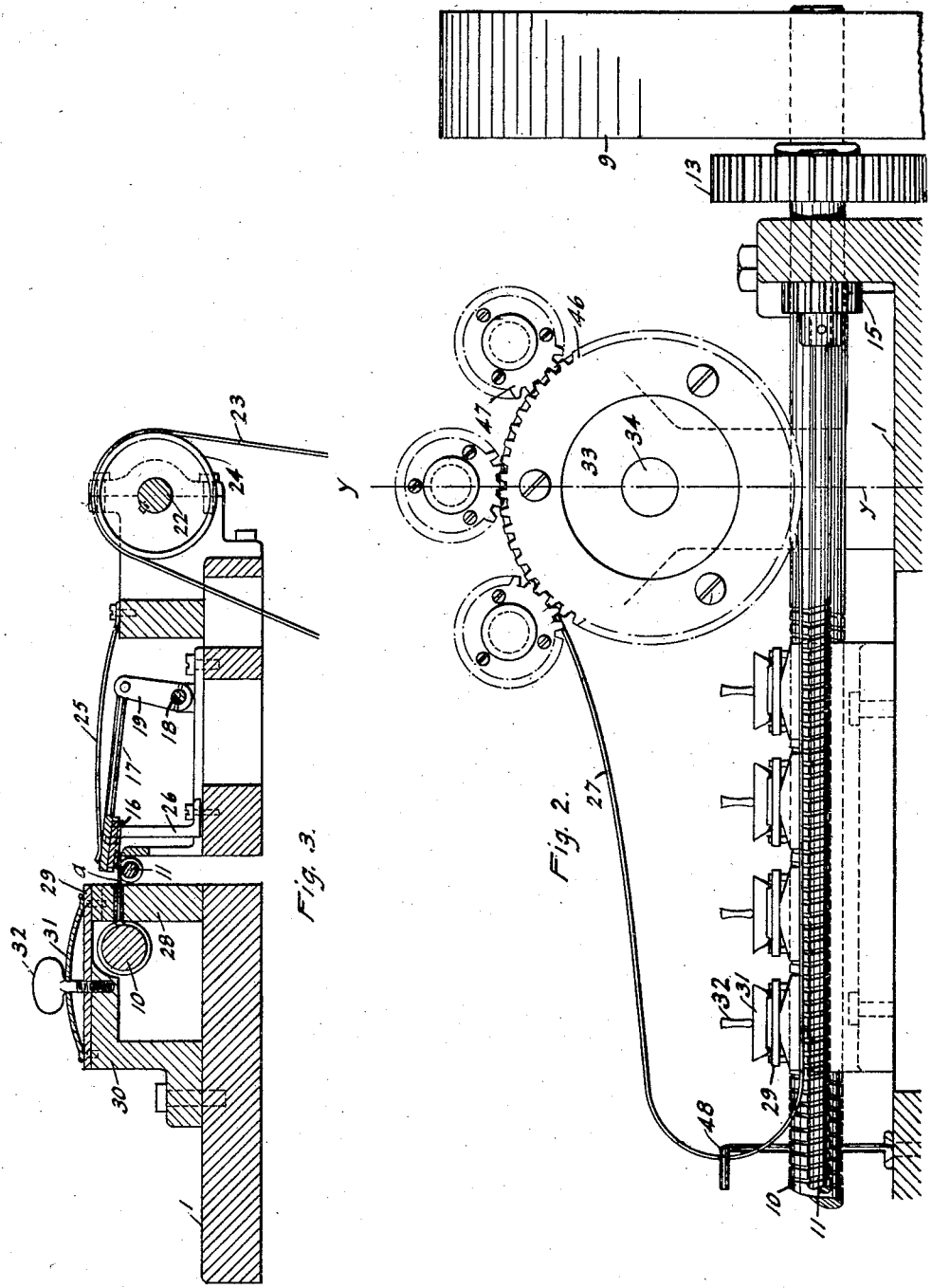

No. 869,007. PATENTED OCT. 22, 1907.
W. D. MIDDLEBROOK.
WIRE WORKING MACHINE.
APPLICATION FILED MAR. 28, 1906.
3 SHEETS—SHEET 3.
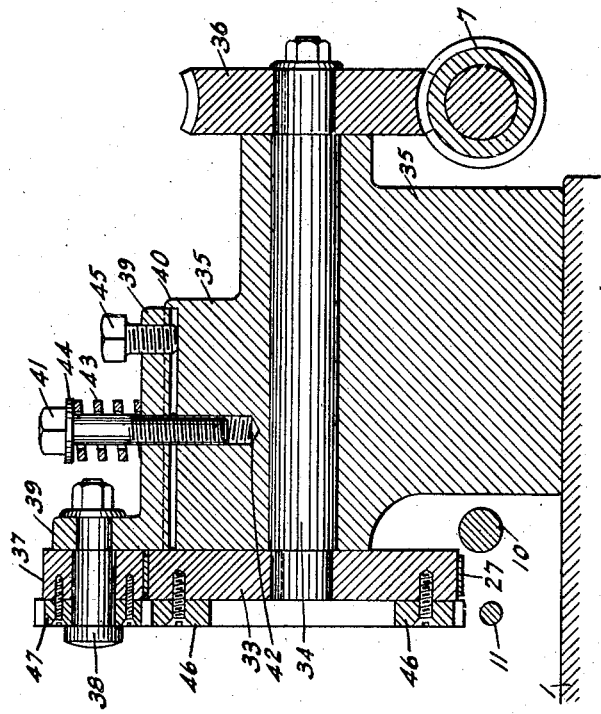
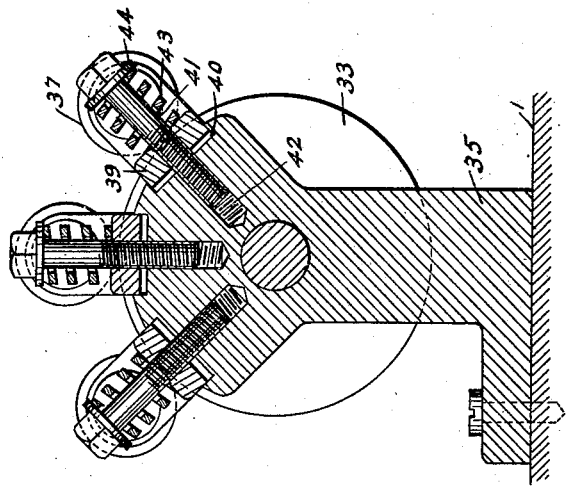
WITNESSES.
James H. Thurston
Catherine G. Bradley
INVENTOR.
William D. Middlebrook,
By Wilmarth & H. Thurston
Att'y.

UNITED STATES PATENT OFFICE.

WILLIAM D. MIDDLEBROOK, OF WATERBURY, CONNECTICUT, ASSIGNOR TO OAKVILLE COMPANY, OF WATERBURY, CONNECTICUT, A CORPORATION OF CONNECTICUT.

WIRE-WORKING MACHINE.

No. 869,007.     Specification of Letters Patent.     Patented Oct. 22, 1907.

Application filed March 28, 1906. Serial No. 308,529.

*To all whom it may concern:*

Be it known that I, WILLIAM D. MIDDLEBROOK, of Waterbury, in the county of New Haven and State of Connecticut, have invented certain new and useful Improvements in Wire-Working Machines; and I do hereby declare the following specification, taken in connection with the accompanying drawings, forming a part of the same, to be a full, clear, and exact description thereof.

My invention relates to wire-working or similar machines in which it is necessary or desirable at certain times to rotate the articles to be operated upon.

In illustrating the features of invention I have shown them as embodied in a pin-pointing machine, but it will be understood that the several features may be embodied in various other machines.

In pin-pointing machines an endless belt is commonly employed which travels in contact with the pins as they are fed along in screw conveyers and imparts to said pins a rotary movement so that the pointing devices may operate upon the pins to produce the necessary conical points. In machines of this character as heretofore constructed this endless belt for rotating the pins has passed around two driving pulleys, each of which was positively driven, and in order to keep the endless belt under the necessary tension each of said driving pulleys was made adjustable toward and from its fellow pulley. In order to accomplish such adjustment, however, it was necessary to correspondingly adjust the driving mechanism, and this necessitated the stopping of the machine. In addition to this objection it was a matter of great difficulty to keep the endless belt sufficiently tight to properly rotate the pins, and in maintaining the required tension the belt would frequently break or become stretched out of shape and ineffective for its purpose.

The object of the present invention is to overcome these objections, and to that end the primary feature of the invention consists in a construction and arrangement of parts whereby the endless belt is under tension for only a portion of its length, one leg of the belt being practically without tension thereon.

The invention further consists in certain constructions and arrangements of parts hereinafter described and claimed.

Referring to the drawings, Figure 1 is a plan view of the pointing portion of a pin machine embodying the features of my invention, Fig. 2 is a sectional elevation on line *w—w*, Fig. 1, on an enlarged scale, Fig. 3 is a transverse section on the line *x—x*, Fig. 1, on an enlarged scale, Fig. 4 is a section on the line *y—y*, Fig. 2, Fig. 5 is a section on the line *z—z*, Fig. 1.

In the drawings 1 represents the bed of the machine which may be mounted upon standards not shown.

Mounted in suitable bearings upon one end of the bed 1 is the driving shaft 2 carrying the driving pulley 3 at one end and a bevel gear 4 near its other end. The bevel gear 4 engages a bevel gear 5 mounted on one end of a shaft 6 carrying the worm-gear 7, spur gear 8, and pulley 9, all keyed or otherwise secured thereon.

The means for feeding the pins along while they are being acted upon by the pointing devices consist of two screw-conveyers 10 and 11, the head of the pin resting in the spiral groove in the conveyer 10 and the body or shank of the pin resting near its end in the conveyer 11, as shown in Fig. 3. The screw-conveyer 10 is driven by the spur-gear 8 through the idler 12 and the gear 13 secured to said conveyer 10, and the screw-conveyer 11 is driven from the conveyer 10 through the gears 14 and 15, as shown in Fig. 1.

As the pins A are fed along in the screw-conveyers 10 and 11 the ends of said pins are acted upon by the pointing devices, which consist of a series of files 16 held in the holders 17 which are operated by the rock-shaft 18 through arms 19 to which the file-holders 17 are pivotally connected, as shown in Fig. 3. The rock-shaft 18 is operated to reciprocate the files 16 by means of the arm 21 operated by an eccentric on the shaft 22. The shaft 22 is driven at a high rate of speed by means of a belt 23 passing over the pulley 24 secured to said shaft, which belt is driven by a large pulley on an intermediate shaft beneath the bed of the machine, not shown, said intermediate shaft being driven from the pulley 9 on the worm-shaft 6. A series of flat springs 25 press upon the files 16 to keep them in contact with the ends of the pins, and a series of adjustable brackets 26 mounted upon the bed of the machine serve as guides for the file holders 17 to slide in, and also serve as stops to regulate the contact of each file with the pin point so that the pins will be of uniform length. As the pins are being fed along by the screw-conveyers and acted upon by the files 16, it is necessary to revolve the pins in order to produce the proper conical points therein. The means for thus revolving the pins consists of an endless belt 27 arranged to travel in contact with the pins as they lie in the screw-conveyers 10 and 11. The pins *a* as they lie in the screw-conveyers also rest upon a stationary bed 28 located between the conveyers 10 and 11, said bed being provided with a roughened surface with which the pins contact, which roughened surface coöperates with the traveling belt to rotate the pins. The endless belt 27 is held in contact with the pins *a* by means of a series of presser-bars 29 mounted upon the bracket 30. Overlying the presser bars 29 are flat bow springs 31, the tension of which may be adjusted by the thumb-screws 32, thereby adjusting the pressure of the presser-bars upon the belt 27.

The endless belt 27 is driven by a pulley 33 secured to the shaft 34, which shaft is journaled in the block 35 secured to the bed of the machine. The shaft 34 is provided with a worm-wheel 36 secured thereto and driven by the worm-gear 7, as shown in Figs. 1 and 4. In order to hold the endless belt 27 against the face of its driving pulley 33 under sufficient pressure to prevent slipping and to drive said belt against the tension produced by the presser-bars 29, a series of presser-rolls 37 are provided. These presser rolls 37 are loosely mounted on studs 38 carried by blocks 39 adjustably mounted in slots 40 formed in the fixed block 35, said presser-rolls being arranged to overlie the endless belt 27 and hold it in contact with the driving pulley 33.

The adjustable blocks 39 are held in place in the slots 40 by screws 41 which pass through holes in said blocks and engage the tapped holes 42 in the fixed block 35. Surrounding each of the screws 41 is a spring 43, one end of which bears against the washer 44 underlying the head of the screw and the other end of which bears against the adjustable block 39. These springs 43 operate to press said blocks inward and thus to press the presser-rolls 37 against the belt 27. By turning the screws 41 the tension of the springs 43 may be adjusted to regulate the pressure of the presser rolls upon the belt. Mounted in each block 39 is a screw 45, the inner end of which may be adjusted to bear against the bottom of the slot 40 and thus limit the inward movement of the block. The presser rolls 37 are driven by the gear-wheel 46 secured to the driving pulley 33 and engaging the pinions 47 secured to the presser rolls 37. The number and location of the presser rolls 37 around the driving pulley 33 may be varied as desired, so long as the endless belt 27 is made to hug the driving pulley sufficiently tight and throughout a sufficient distance to properly operate said belt. It is, however, preferred to locate at least one of said presser-rolls 37 at the upper portion of the driving pulley and beyond the center thereof, and so that it will serve to control the upper loose leg of the belt and prevent its flapping. As a result of the construction above described the endless belt 27 is held under the necessary tension from the point where it is acted upon by the first presser-bar 29 around to the point where it is acted upon by the last presser-roll 37. From the point where the belt leaves the last presser-roll, however, along to the first presser-bar 29, there is no tension whatever on said belt, and the upper leg of said belt extending from the driving pulley to the first presser-bar hangs loose. As a guide for the belt at its outer bend it is preferred to employ a guide-wire 48 secured to the bed of the machine in front of the first presser-bar 29 and adapted to engage and guide the belt at this point, but, if desired, such guide may be dispensed with. So also, if desired, an idler pulley may be employed in place of the guide 48, but this has been found in practice to be unnecessary.

As will be seen, only one driving pulley is employed, the other driving pulley heretofore required, together with its driving mechanism, being entirely eliminated. As will also be understood, stretching of the belt is much less likely to occur, and when it does occur it does no harm, and no adjustments are required to take up the stretch, as has heretofore been necessary. As the belt is or may be normally slack throughout a portion of its length, it makes no difference if the amount of this slack be increased more or less by stretching of the belt.

Various other difficulties attending the use of the old arrangement of driving pulleys with the belt stretched tightly over the same are also overcome with the arrangement of belt and single driving pulley herein described.

What I claim as my invention and desire to secure by Letters Patent is:

1. In a machine of the class described, the combination of an endless belt for rotating the articles to be operated upon, and means for keeping said belt under tension through only a portion of its length, substantially as described.

2. In a machine of the class described, the combination of an endless belt for rotating the articles to be operated upon, and adjustable means for keeping said belt under tension through only a portion of its length, substantially as described.

3. In a machine of the class described, the combination of an endless belt for rotating the articles to be operated upon, means for driving said belt, and means for keeping said belt under tension through only a portion of its length, substantially as described.

4. In a machine of the class described, the combination of an endless belt for rotating the articles to be operated upon, a driving pulley for said belt and means for exerting a pressure upon said belt as it passes over said driving pulley, substantially as described.

5. In a machine of the class described, the combination of an endless belt for rotating the articles to be opened upon, a driving pulley for said belt, and an adjustable presser-roll adapted to engage said belt as it passes over said driving pulley, substantially as described.

6. In a machine of the class described, the combination of an endless belt for rotating the articles to be operated upon, a driving pulley for said belt, and a series of adjustable presser-rolls adapted to engage said belt as it passes over said driving pulley, substantially as described.

7. In a machine of the class described, the combination of an endless belt, means for holding said belt in contact with the articles to be operated upon, means for driving said belt to rotate the wire, and means to keep said belt under tension through part of its length, substantially as described.

8. In a machine of the class described, the combination of means for feeding the articles to be operated upon, a support for said articles, an endless belt coöperating with said support to rotate said pins, means for pressing said belt against said pins, a driving pulley for said belt, and means overlying said belt and driving pulley and coöperating with said pulley to drive said belt, substantially as described.

WILLIAM D. MIDDLEBROOK.

Witnesses:
WALTER PLACE,
GEORGE BODEN.